United States Patent [19]

Dubey

[11] Patent Number: 5,043,661
[45] Date of Patent: Aug. 27, 1991

[54] EDDY CURRENT DISTANCE MEASURING DEVICE WITH TEMPERATURE CHANGE COMPENSATION CIRCUITRY

[75] Inventor: Pierre Dubey, Belfaux, Switzerland

[73] Assignee: Vibro-Meter S.A., Fribourg, Switzerland

[21] Appl. No.: 365,119

[22] Filed: Jun. 12, 1989

[30] Foreign Application Priority Data

Jun. 17, 1988 [CH] Switzerland .......................... 2344/88

[51] Int. Cl.⁵ ...................... G01N 27/72; G01R 33/00; G01B 7/14
[52] U.S. Cl. ........................... 324/207.12; 324/207.15; 324/207.26; 324/225
[58] Field of Search ............... 324/207, 208, 224, 225, 324/236, 207.12, 207.15, 207.26, 207.13; 336/30, 45, 55

[56] References Cited

U.S. PATENT DOCUMENTS 4,716,366 12/1987 Hosoe et al. ........................ 324/225

FOREIGN PATENT DOCUMENTS 0049304 4/1982 European Pat. Off. .
60-67819 4/1985 Japan .

Primary Examiner—Walter E. Snow
Attorney, Agent, or Firm—Brady, O'Boyle & Gates

[57] ABSTRACT

The damping of a coil (L1) can be influenced by an object (1) so that the high-frequency voltage at the coil (L1) depends on the distance (a) of the object (1) from the coil (L1). A constant dc current is superimposed on the high-frequency current through the coil, the dc voltage drop at the coil (L1) which corresponds to the dc resistance of the coil (L1), damping the coil (L1), being influenced by the temperature. The high-frequency excitation (5, 6) of the coil (L1) is controlled by the dc voltage drop in order to compensate for the influence of the temperature on the high-frequency voltage so that the high-frequency voltage depends solely on the distance (a). The high-frequency voltage, having a nonlinear correlation to the distance (a), is linearized in a nonlinear member (15) with a semiconductor element with respect to the distance (a). In this connection, the effect of the temperature on the linearization is compensated for by means of a second semiconductor element.

10 Claims, 2 Drawing Sheets

EDDY CURRENT DISTANCE MEASURING DEVICE WITH TEMPERATURE CHANGE COMPENSATION CIRCUITRY

The invention relates to a device for distance measurement.

In such devices, the coil is usually the oscillator circuit coil of a high-frequency oscillator and yields the high-frequency signal in dependence on its damping. Damping is based on the effective resistance of the coil resulting in part from the eddy current losses in the object which have a reactive effect on the coil and to the other part from the direct-current resistance of the coil dependent on the coil temperature.

The advantage of distance measurement using devices of the present type resides essentially in that it is enough to arrange merely the coil at the measuring site while the oscillator and the evaluating circuit can be operated at a certain distance from the measuring site, in particular at room temperature whereas the coil at the measuring site is exposed to a higher (or lower) temperature at which the other components of the device could not be operated, particularly if they are equipped with semiconductor elements.

However, at temperatures deviating considerably from room temperature, the effect of the temperature on the proportion of damping caused by the direct-current resistance of the coil can no longer be neglected so that the high-frequency signal depends on the distance of the object from the coil as well as on the temperature of the latter. For example, the direct-current resistance of the coil rises to approximately twice the value with a temperature increase by 250° C.

In order to avoid dependency of the distance signal, obtained from the high-frequency signal, on the temperature, it has been suggested to generate a direct-current signal dependent on the coil temperature by means of a direct-current source supplying the coil, and to utilize this direct-current signal for compensating the effect of the temperature on the distance signal.

The dc voltage signal can be obtained as a voltage drop of a constant direct current flowing through the coil.

EP-A-0 049 304 discloses a device of this kind wherein a signal obtained from the high-frequency signal and a signal obtained from the dc signal are fed to a summing member yielding the distance signal as the sum signal. If, in this known device, the temperature of the coil changes, then the dc signal and the signal obtained therefrom and fed to the summing member are changed. The consequence thereof is a corresponding change of the distance signal, obtained as the sum signal from the summing member, even in case the distance of the coil from the object has remained unchanged, i.e. the distance signal, with constant spacing, changes with the temperature.

The invention attains the object of providing a device for distance measurement having improved temperature compensation.

In the device of this invention, the energy lost in the temperature-dependent dc resistance of the coil is in all cases covered by the correspondingly temperature-controlled high-frequency current source so that the magnetic alternating field produced by the coil is independent of the temperature.

Patent Abstracts of Japan, vol. 9, No. 203 (P-381) (1926), Aug. 21, 1985, describes a distance measuring device of a different type which is to be temperature-compensated by applying a temperature-dependent dc signal to the oscillator. However, the description and the circuit diagram are incomprehensible, even if taken in conjunction with each other. The arrangement has four switches jointly controlled by a clock, and a measuring head which, in any event, contains the coil and has four terminals, the second and fourth of which are grounded. In one position of the switches, the first terminal is connected to an oscillator and the third terminal is connected, via an amplifier, a rectifier, and a log member, to a holding current circuit controlled by the clock, this circuit yielding the distance signal. In the other position of the switches, the connection of the oscillator with the first measuring head terminal and the connection of the log member with the holding circuit are interrupted, the third measuring head terminal is connected, instead of being connected to the amplifier, with a direct-current source yielding a constant direct current; the dc voltage present at this third measuring head terminal and dependent on the coil temperature is applied to the input of a circuit yielding a signal to the oscillator. However, since in this switch position the measuring head is neither connected to the oscillator nor to the amplifier, and the log member is not connected to the holding circuit, either, and, when switching the switches back into their first position, the dc source is turned off and furthermore the input of the circuit applying the signal to the oscillator is grounded, the oscillator oscillates exactly as before, and the distance signal is not temperature-compensated. A compensation of the effect of the temperature on the distance signal is not disclosed. Also, this device is different from the present device with respect to its type as well. In this device, the direct current in the coil is not superimposed on the high-frequency current; rather, either high frequency or dc current flows through the coil, depending on the position of the switches.

As mentioned further above, the magnetic, high-frequency alternating field of the coil is independent of the temperature in the device according to this invention. In this arrangement, the damping of the coil by the object is always affected under identical conditions, and a high-frequency signal is produced which depends solely on the spacing of the object from the coil.

The invention, including special embodiments, will be described in greater detail below with reference to the appended drawings, illustrating only one version of carrying out the invention, wherein.

Figure 1:
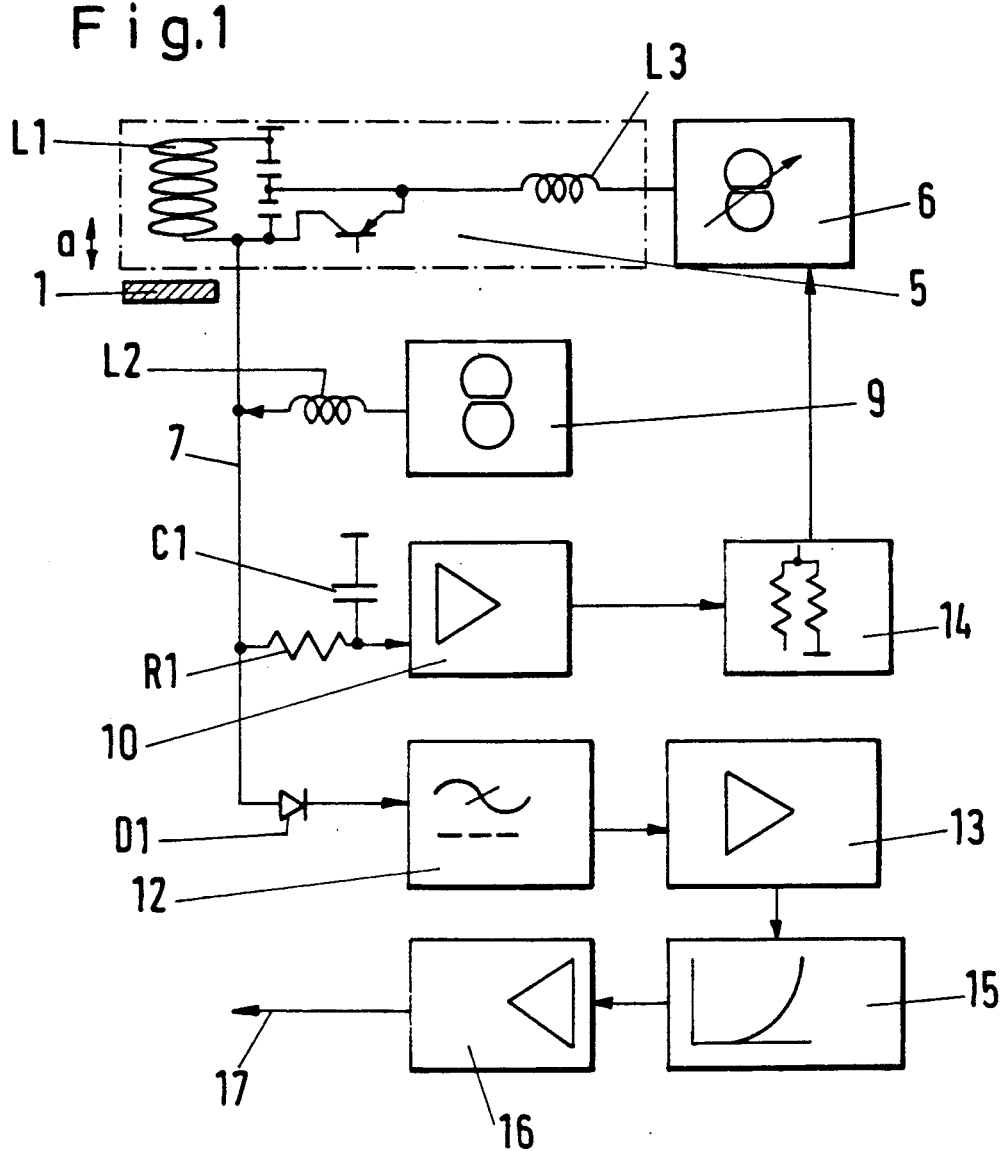
FIG. 1 shows a block diagram.
Figure 3:
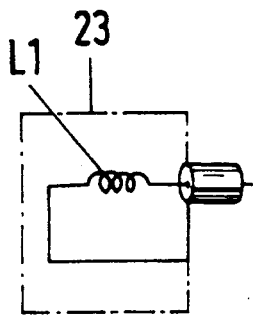

By means of the device, a signal is produced dependent on the spacing a of an object 1 from a high-frequency-excited coil L1. For this purpose, the object 1 is arranged at an end face of the coil L1 and, unless it is itself electrically (or magnetically) conductive, is provided with a coating (not shown) having these properties. As can be seen in principle from FIG. 1 and in detail from FIG. 2, the coil L1 is the oscillator circuit coil of a high-frequency oscillator 5, the high-frequency voltage of which is applied to a line 7, a diode D1 with subsequent smoothing member 12 being connected to this line. Since the reactive effect of the eddy currents induced in the object 1 on the coil L1 increases the damping of the oscillatory circuit to an extent dependent on the distance a, and thereby reduces its high-frequency voltage, the output voltage of the smoothing member 12 is a signal dependent on the distance a.

Damping of the oscillator circuit also depends on the dc resistance of the coil L1 which is dependent on the temperature. Consequently, the output voltage of the filter member 12 additionally depends also on the temperature of the coil L1.

In order to compensate for the influence of the temperature on the output voltage of the filter member 12, a direct current of a constant current source 9 is superimposed on the high-frequency current flowing through the coil L1, and the voltage drop of the direct current at the coil L1 is applied, as the input variable, to a control circuit 10, 6 which controls the dc current feeding the oscillator in dependence on the dc voltage drop and thereby counteracts changes in the high-frequency voltage due to the temperature.

For this purpose, the constant current source 9 is connected to the line 7 by way of a high-frequency choke coil L2 which keeps the high frequency away from the constant current source 9, and the control circuit exhibits an inverting amplifier 10, a resistor network 14, and a controllable current source 6 yielding direct current supplying the oscillator 5. The input of amplifier 10 is connected to the line 7 by way of an RC member R1, C1 constituting a high-frequency blocking unit; the output voltage of this RC member is applied to the input of the resistor network 14, the output of which is connected to the control input of the current source 6. In case of an increase in coil temperature, the dc voltage drop at the coil L1, applied to the input of amplifier 10, increases. During this process, the output voltage of the amplifier increases, along with the control voltage of the controllable current source 6, and an amplifier 04 (FIG. 2) of the current source 6, supplying the supply direct current of the oscillator 5, brings about an increase in the supply current and thus in the excitation of the coil L1. Upon a reduction in the coil temperature, the processes take place correspondingly conversely. With otherwise given data of the circuit components 5, 6, 10, the network 14 has the effect that the amount by which the control circuit 10, 14, 6 changes the high-frequency excitation of the coil L1 in case of a change in its temperature is equal to the amount by which the excitation would be altered if the control circuit 10, 14, 6 were nonexistent. As a result, the influence of the temperature of coil L1 on the high-frequency excitation thereof is compensated so that the high-frequency voltage and the signal corresponding to this voltage at the output of the filter member 12 depend only on the distance of the object 1 from the coil L1.

In this way, the current source 6 supplying the oscillator 5, for compensating for the temperature dependency of the dc resistance of the coil L1, is controlled by the signal, dependent on this resistance, at the output of the amplifier 10.

If the distance a becomes larger with constant temperature, the output voltage of the smoothing member 12 increases, the input of the amplifier 13 becomes more positive, the output voltage of the amplifier 13 increases, whereby the current supplying the oscillator 5 becomes weaker. As a result, a signal increasing with increasing distance a is obtained at the output line 17, this signal being independent of the temperature.

The dependency of the high-frequency voltage at the coil L1 on the distance a is nonlinear. This high-frequency voltage initially rises steeply with increasing distance a and then gradually rises ever less steeply.

A signal practically linearly dependent on the distance a can be obtained by a nonlinear transfer member from the high-frequency voltage rectified by means of diode D1 and smoothed in the smoothing member 12, the output voltage of this transfer member increasing initially less steeply with increasing input voltage and then rising more steeply. Semiconductor components with a barrier layer, especially diodes, exhibit, as is known, a current-voltage characteristic which increases initially less steeply with increasing voltage in the range of low voltages and then increases more steeply. Thus, a nonlinear transfer member 15 can be obtained for the rectified and smoothed high-frequency voltage, this member yielding a signal, the dependence of which on the distance a is linear.

The characteristic of a diode in case of temperature fluctuations is subject to appreciable changes even in the room temperature range. For this reason, a nonlinear member 15 is provided in the circuit arrangement according to FIGS. 1 and 2, of a type which will be described in greater detail below, wherein the temperature dependency of the diode characteristic is compensated for. This nonlinear member cooperates with an amplifier 16 yielding the desired signal at the output 17 of the circuit arrangement. In this system, the dependence of this signal on the distance a is linear, and the signal, as explained above, is independent of the temperature of the coil L1, and also the effect of the temperature on the diode characteristic, governing for linearization, is compensated for, as will be described in greater detail below.

Figure 2:
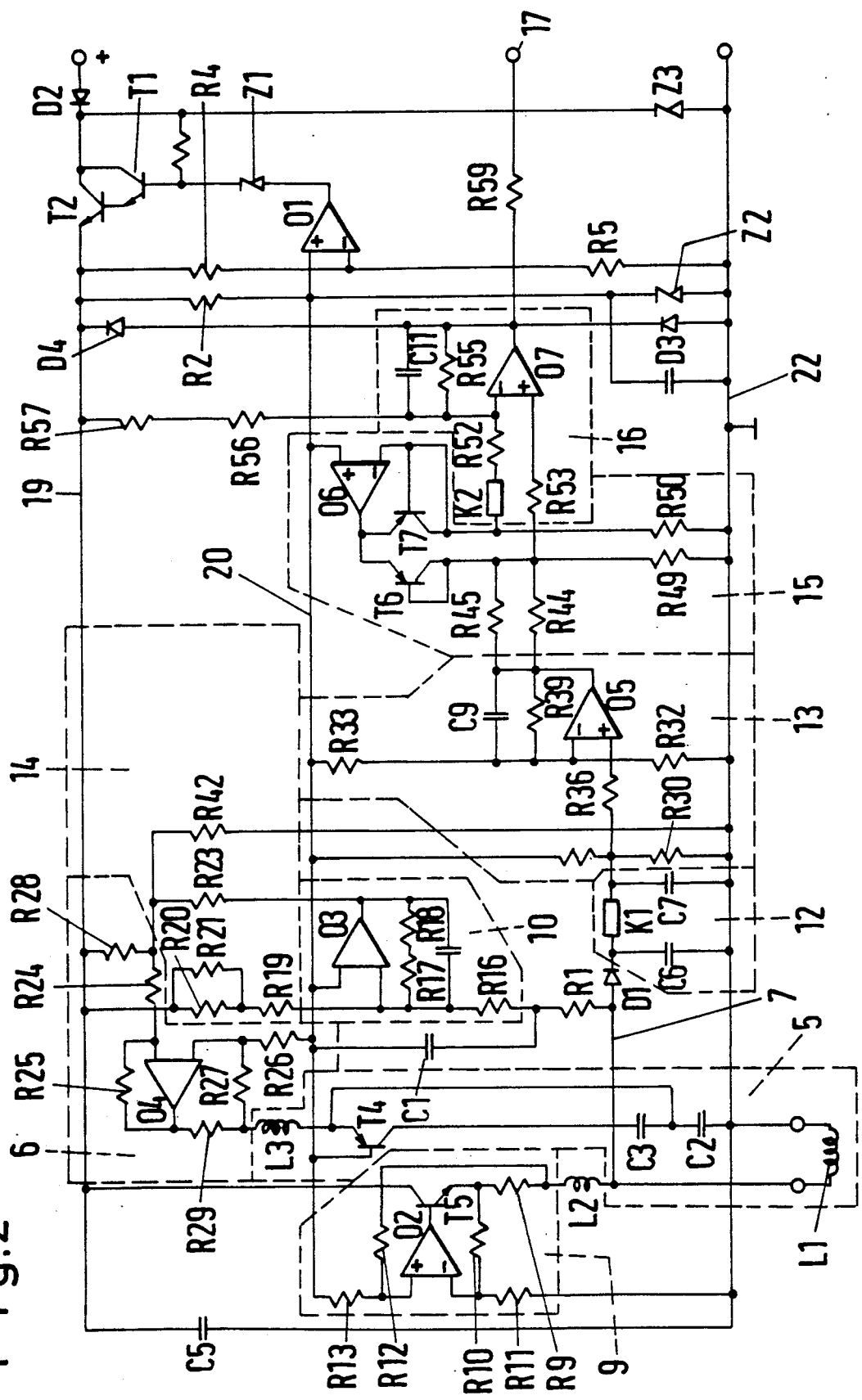
FIG. 2 shows the detailed circuit diagram of a device according to this invention, and FIGS. 3-5 each show a measuring head.

Details of the circuit components of the circuit arrangement will be described in greater depth below with reference to FIG. 2.

Current is supplied to the circuit components 5, 6, 9, 10, 12, 13, 14, 15, and 16 at a line 19 with, for example, about 17.2 volt, and a line 20 with, for example, 6.3 volt based on ground 22. These voltages are stabilized in a basically conventional way by means of a Darlington connection T1, T2, a differential amplifier 01, and two Zener diodes Z1 and Z2.

The high-frequency oscillator 5 is a Colpitts oscillator in base connection to a transistor T4 and the oscillator circuit formed by the coil L1 and two capacitors C2 and C3, this circuit being connected, on the one hand, with the collector of transistor T4 and the line 7, carrying the high frequency, and, on the other hand, being connected to ground 22.

The smoothing member 12 contains, for smoothing rectified high frequency, conventionally two capacitors C6, C7 and a resistor K1 which latter, for the compensation of effects of the temperature on the circuit arrangement (without coil L1), especially the semiconductor diode D1, is designed as a PTC resistor.

The constant current source 9 is conventionally designed with an operational amplifier 02, a transistor T5 in collector connection, and five resistors R9 through R13. This current source supplies the constant dc current to the end of coil L1 carrying the high frequency and being connected to line 7. This current is dimensioned, for example, so that the dc voltage drop at the coil L1 is about 0.2 volt at room temperature. In this connection, the collector current of transistor T4, likewise flowing through coil L1 and being altered perforce with the distance a, is negligible. The current flowing through the resistors R1, R16, R19, R20/21 and the coil L1 is likewise unimportant herein; by the way, this current is also stabilized because of the stabilized voltage at line 19, even though with larger deviations than the current of the constant current source 9 which latter, in turn, is fed with this voltage.

The controllable current source 6 contains, as the adjusting member for the dc current supply to the oscillator 5, an operational amplifier 04 and resistors R24 through R29. In this connection, the output voltage of the resistor network 14 represents the adjusting variable at the input of the operational amplifier 04.

The amplifier 13 is an operational amplifier 05, the noninverting input of which is connected through a resistor R36 to the output of the filter member 12, and the inverting input of which is fed by a voltage divider R32, R33.

The resistor network 14 contains a resistor R23 connecting the output of the amplifier 10 to the control input of the current source 6, a resistor R24 being furthermore connected in front of this input. By the resistors R28 and R42, the required bias is obtained at the inverting input of the amplifier 04. The resistors R33 and R42 have the effect, jointly with the resistor R28, that the voltage at the control input of the current source 6, dependent on the temperature of coil L1, is as high as required for maximally complete compensation.

Figure 4:
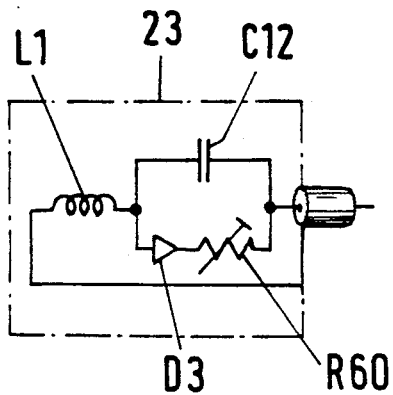
Figure 5:
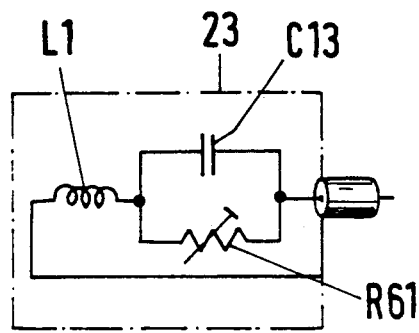

The aforedescribed compensation of the influence of the temperature on the high-frequency voltage of the coil L1 by the temperature-dependent dc current resistance of the coil L1 is no longer adequate, as has been found, if the coil L1 is exposed to extreme temperatures, for example 24° K. or 300° C. In such a case, additional, different temperature-dependent effects act on the damping and therefore on the high-frequency voltage of the coil L1. For example, these effects could be dielectric losses in the insulation of the coil wire, or eddy current losses in the bobbin (not shown). In order to take into account even these additional effects in the intended temperature compensation, the measuring head 23 containing the coil can be equipped with a network D3, R60, C12 according to FIG. 4. The suitable network and its elements, especially the type of diode D1, and the resistance value, as well as the (temperature-dependent) material of the resistor R60 and, respectively, R61, can be determined by tests. The resistance value of R60 and, respectively, R61, however, is to amount to no more than 5%, at most 10%, of the dc current resistance of the coil L1. The capacitor C12 and, respectively, C13 is to be dimensioned so that its impedance at the respective frequency is negligibly low, as compared with the resistance of the series circuit D1, R60 and/or as compared with the resistor R61. Its capacitance must be a multiple of the capacitance of C2 and of C3. As can be seen from FIGS. 4 and 5, the additional network D5, R60, C12 and, respectively, R61, C13 is connected in series with the coil L1 so that the measuring head also in these versions has only two terminals, and the compensation takes place with a single dc voltage, i.e. the dc current source 6 of the oscillator 5 is controlled by only one dc voltage containing all temperature-dependent influences. Basically, it would also be possible, of course, to have a voltage only dependent on the dc resistance and a voltage determined by the network, which act on the dc current source 6.

The nonlinear member 15 contains two parallel-connected branches, each of which consists of a transistor T6 and T7, respectively, connected as a diode, in series with a resistor R49 and R50, respectively. Transistors are used because such a pair is commercially available in a housing on a semiconductor substrate maintaining both transistors at the same temperature, and, as described further below, such a pair is required for temperature compensation of an electric signal. The branches T6, R49 and T7, R50 are located in FIG. 2 at the output of an operational amplifier 06, the noninverting input of which is connected to the line 20, and the inverting intput of which is connected to the base and the collector of transistor T7. This operational amplifier 06 is not a basic requirement; it merely brings about a further improvement in the action of the nonlinear member 15. For this reason, the mode of operation of an embodiment is described wherein the branches T6, R49 and T7, R50 are directly connected to the line 20 (without operational amplifier).

In both embodiments, the transistors T6 and T7 have the same characteristics, and in the rest position, identical voltage drops prevail at the resistors R49 and R50 so that, in the rest condition, identical voltages are present at the transistors T6 and T7 connected as diodes. The output of the amplifier 13 is connected via a resistor R44 to the end of resistor R49 joined to the base and the collector of transistor T6, so that the output voltage of this amplifier 13 increases the voltage at this resistor R49. Thereby, the voltage at transistor T6 increases whereby its operating point is shifted at its current-voltage characteristic, and the current applied thereby to the resistor R49 decreases in correspondence with the characteristic in a more than proportional fashion with respect to the output voltage of the differential amplifier 05. Thereby, relatively small changes in the output voltage of the differential amplifier 05 (circuit component 13) are counteracted to a relatively lesser extent, and more substantial changes are countered to a relatively stronger extent. The degree of this counteraction depends on the position of the operating point in the rest position and on the resistor R49 and can be dimensioned so that the dependency of the voltage at resistor R49 on the distance a is practically linear.

The current-voltage characteristic of the transistors T6 and T7 connected as diodes is temperature-dependent even in the range of usual room temperatures. This temperature influence is compensated by connecting the end of resistor R49 facing the transistor T6 by a resistor R53 to the noninverting input, and the end of resistor R50 facing the transistor T7 by means of a PTC resistor K2 and a resistor R52 to the inverting input of an operational amplifier 07, the output of the latter yielding the desired signal, linearly dependent on the distance a, at the output 17 of the circuit arrangement. In this system, this signal is determined by the difference of the voltages at the resistors R49 and R50. The voltage at R49 has evolved from the high-frequency voltage at the coil L1 and is linearized by means of transistor T6 with respect to the distance a. The voltage at R50 is an auxiliary voltage (independent of the distance a). Both voltages depend, with a small deviation, in conformance on the temperature of the transistors T6 and T7 so that their difference, i.e. the linearized output voltage at 17, is (apart from the small deviation) temperature-independent. This deviation arises because the two voltages are nonidentical, and for this reason the operating points of the transistors T6 and T7, connected as diodes, lie at differing points of their characteristic. The PTC resistor K2 serves for balancing this deviation.

I claim:

1. A eddy current distance signal device for measuring a distance (a) between a sensor (L1) of the device and an electrically conductive object (1), comprising in combination a sensor coil (L1), a high-frequency current source (5, 6) connected for feeding a high-frequency current directly to the coil (L1) for producing a high-frequency signal therefrom dependent on the damping of the coil (L1) by the distance (a) of the electrically conductive object (1) from the coil (L1), a demodulator (D1, 12) connected directly to the coil (L1) for producing a distance signal from the high-frequency signal, a direct current source (9), a first high-frequency blocking unit (L2) connected to the direct current source (9) and connected to the coil (L1) for yielding a direct current from the direct current source (9) via the first high-frequency blocking unit (L2) to the coil (L1), this direct current being superimposed on the high-frequency current, for producing a direct current signal determined by the temperature-dependent direct current resistance of the coil (L1), a second high-frequency blocking unit (R1, C1) connected to the coil (L1), and control means (10, 14) connected to the second high-frequency blocking unit (R1, C1) and to the high-frequency current source (5, 6) for increasing the high-frequency current when the direct current signal increases, and decreasing the high-frequency current when the direct current signal decreases, thereby eliminating the influence of the temperature of the coil (L1) on the distance signal.

2. Device according to claim 1, in which said high-frequency current source is an oscillator (5) and the coil is the oscillator circuit coil (L1) of the oscillator (5).

3. Device according to claim 2, in which said oscillator is a Colpitts oscillator (5).

4. Device according to claim 1, in which said direct current source (9) yields a constant direct current, and the direct current voltage drop at the coil forms the direct current signal.

5. Device according to claim 1, in which the direct current signal controls the direct current supply (6) of the high-frequency current source (5) in order to compensate for the influence of the temperature on the high-frequency signal.

6. Device according to claim 1, in which said demodulator (D1, 12) is followed by an amplifier (13) and a nonlinear resistance network (15) for linearizing the dependency of the signal of the distance (a) of the object (1) from the coil (L1).

7. Device according to claim 6, in which said nonlinear resistance network (15) comprises a series circuit of a diode (T6) and a first resistor (R49), supplied by a constant direct current voltage, and a second resistor (R44, R45) connecting said amplifier (13) to the junction of said diode (T6) and said first resistor (R49), said first resistor (R49) yielding the distance.

8. Device according to claim 1, including a measuring head (23) containing said coil (L1) and a network (D3, R60, C12; R61, C13) for producing a direct current signal dependent on the temperature of the measuring head (23), and the high-frequency current source (5, 6) is controlled in dependence on this direct current signal in order to compensate for the influence of the temperature of the measuring head on the high-frequency signal.

9. Device according to claim 8, in which said network (D3, R60, C12; R61, C13) is connected in series with the coil (L1), the direct current of the direct current source (9) flows through this series circuit, and is kept constant, and said high-frequency current source (5, 6) is controlled in dependence on the direct current voltage drop at the series circuit in order to compensate for the influence of the temperature of the measuring head (23) on the high-frequency signal.

10. Device according to claim 6, wherein said nonlinear resistance network (15) has a first and a second series circuit (T6, R49 and T7, R50) connected in parallel to a constant voltage, the first series circuit (T6, R49) having a first diode (T6) connected in series with a first resistor (R49), and the second series circuit (T7, R50) having a second diode (D7) connected in series with a second resistor (R50), a third resistor (R44/45), connecting the junction of said first diode (T6) and said first resistor (R49) to said amplifier (13), a further amplifier (07) following said nonlinear resistance network (15), said further amplifier (07) having a noninverting input connected to the junction of said first diode (T6) and said first resistor (R49), and an inverting input connected to the junction of said second diode (T7) and said second resistor (R50), and said further amplifier (07) having an output yielding the distance signal.

* * * * *